(12) United States Patent
Olafsson et al.

(10) Patent No.: US 7,587,034 B2
(45) Date of Patent: *Sep. 8, 2009

(54) USE OF MODEM ON HOLD FOR NETWORK MANAGEMENT AND TELEPHONE ACCESS

(75) Inventors: Sverrir Olafsson, Reykjavik (IS); Andrew Webster, Irvine, CA (US); Craig E. Borden, Placentia, CA (US); Charles F. Raasch, Lake Forest, CA (US); Nimesh Doshi, Anaheim, CA (US); Burk Beadle, Irvine, CA (US); Robert T. Otten, Orange, CA (US)

(73) Assignee: Silicon Laboratories Inc., Austin, TX (US)

( * ) Notice: Subject to any disclaimer, the term of this patent is extended or adjusted under 35 U.S.C. 154(b) by 482 days.

This patent is subject to a terminal disclaimer.

(21) Appl. No.: 11/072,776

(22) Filed: Mar. 3, 2005

(65) Prior Publication Data

US 2005/0147224 A1 Jul. 7, 2005

Related U.S. Application Data

(63) Continuation of application No. 09/393,616, filed on Sep. 10, 1999, now Pat. No. 6,912,276, which is a continuation-in-part of application No. 09/394,018, filed on Sep. 10, 1999, now Pat. No. 6,768,791, which is a continuation-in-part of application No. 09/361,842, filed on Jul. 27, 1999, now Pat. No. 6,819,749.

(60) Provisional application No. 60/128,874, filed on Apr. 12, 1999.

(51) Int. Cl.
*H04M 11/00* (2006.01)
*H04B 1/38* (2006.01)

(52) U.S. Cl. ............... 379/93.35; 379/93.32; 379/93.34

(58) Field of Classification Search .............. 379/90.01, 379/93.02, 93.05, 93.09, 93.11, 93.12, 93.13, 379/93.23, 93.29, 93.31–93.35, 142.04–142.08, 379/215.01; 376/222; 370/352, 469
See application file for complete search history.

(56) References Cited

U.S. PATENT DOCUMENTS 4,578,796 A 3/1986 Charalambous et al.

(Continued)

FOREIGN PATENT DOCUMENTS

EP 0 409 641 A3 1/1991

(Continued)

OTHER PUBLICATIONS

Search report, copending application No. EP05019890, May 30, 2007, 6 pgs.

(Continued)

*Primary Examiner*—Melur Ramakrishnaiah
(74) *Attorney, Agent, or Firm*—O'Keefe, Egan, Peterman & Enders LLP (57) ABSTRACT

A modem to modem communication system supports call waiting services by exchanging hold request and acknowledge signals before relinquishing the line servicing incoming calls. Thereafter, the modem to modem session is reestablished without having to redial. The hold request may be denied or accepted, and may define the duration a modem will hold before hanging up. The holding modem maintains the session by fooling the higher protocol layers, making them believe that the modem is not on hold. Three-way calling services are also used to free up the shared line for outgoing calls while maintaining the session with holding modems. A table may be employed to screen incoming calls through a comparison of the caller ID information with that in the table. The table may be within the modem or the host computer.

9 Claims, 5 Drawing Sheets

Fig. 2

U.S. PATENT DOCUMENTS

| | | | |
|---|---|---|---|
| 4,621,366 A | 11/1986 | Cain et al. | |
| 4,852,151 A | 7/1989 | Dittakavi et al. | |
| 4,894,847 A | 1/1990 | Tjahjadi et al. | |
| 4,995,074 A | 2/1991 | Goldman et al. | |
| 5,127,051 A | 6/1992 | Chan et al. | |
| 5,287,401 A | 2/1994 | Lin | |
| 5,317,594 A | 5/1994 | Goldstein | |
| 5,367,563 A | 11/1994 | Sainton | |
| 5,513,251 A | 4/1996 | Rochkind et al. | |
| 5,519,767 A | 5/1996 | O'Horo et al. | |
| 5,550,908 A | 8/1996 | Cai et al. | |
| 5,600,712 A | 2/1997 | Hanson et al. | |
| 5,651,060 A | 7/1997 | Holland et al. | |
| 5,668,861 A | 9/1997 | Watts | |
| 5,729,594 A | 3/1998 | Klingman | |
| 5,757,890 A | 5/1998 | Venkatakrishnan | |
| 5,796,808 A | 8/1998 | Scott et al. | |
| 5,802,153 A | 9/1998 | Sridhar et al. | |
| 5,862,474 A | 1/1999 | Kimball | |
| 5,896,444 A | 4/1999 | Perlman et al. | |
| 5,903,602 A | 5/1999 | Torkkel | |
| 5,940,489 A | 8/1999 | Cohn et al. | |
| 6,330,221 B1* | 12/2001 | Gomez | 370/217 |
| 6,345,071 B1 | 2/2002 | Hamdi | |
| 6,430,219 B1 | 8/2002 | Zuranski et al. | |
| 6,574,239 B1 | 6/2003 | Dowling et al. | |
| 6,757,274 B1* | 6/2004 | Bedingfield et al. | 370/352 |
| 2001/0040945 A1 | 11/2001 | Fujino et al. | |

FOREIGN PATENT DOCUMENTS

| | | |
|---|---|---|
| EP | 0 711060 A1 | 5/1996 |
| EP | 0409641 B1 | 6/1996 |
| EP | 741481 A2 * | 11/1996 |
| EP | 0812096 A2 | 12/1997 |
| EP | 0601260 B1 | 5/1998 |
| FR | 2771577 | 5/1999 |
| WO | WO 96 05684 A | 2/1996 |
| WO | WO 97/49228 | 12/1997 |
| WO | WO 99/27702 | 6/1999 |
| WO | WO 99/ 31813 | 6/1999 |
| WO | WO 99 48304 A | 9/1999 |

OTHER PUBLICATIONS

*ITU-T Telecommunication Standardization Sector of ITU*, V.90, Sep. 1998.

* cited by examiner

USE OF MODEM ON HOLD FOR NETWORK MANAGEMENT AND TELEPHONE ACCESS

CROSS REFERENCES To RELATED APPLICATIONS

This application is a continuation of U.S. application Ser. No. 09/393,616, filed Sep. 10, 1999, now U.S. Pat. No. 6,912,276 which is a continuation-in-part of U.S. application Ser. No. 09/394,018, filed Sep. 10, 1999, now U.S. Pat. No. 6,768,791 which is a continuation-in-part of U.S. patent application Ser. No. 09/361,842, filed Jul. 27, 1999 now U.S. Pat. No. 6,819,749, which claims the benefit of U.S. Provisional Patent Application Ser. No. 60/128,874, filed Apr. 12, 1999, which are hereby incorporated herein by reference in their entirety.

BACKGROUND

1. Technical Field

The present invention relates to the field of modem to modem data communication; and, more specifically, it relates to a modem to modem communication and three-way calling and call waiting telephony services.

2. Description of Related Art

A conventional communication system typically establishes an Internet data session through a local and a remote ISP (Internet Service Provider) modem via a telephone switching network. Similarly, other modem to modem communication uses the telephone switching network as the communication link. Such modems often share a single telephone line with other local telephony devices, e.g., telephones, facsimile machines, answering machines, etc.

To handle multiple incoming calls, telephone switching networks offer three-way calling and call waiting services. Such services can be accessed through manual interaction of a person using a telephone. Telephone switching networks have also added caller identification (caller ID) services to support call waiting. Thus, the person using the telephone may view the caller ID before deciding to accept an incoming call during a ongoing telephone conversation.

To maintain a data session between modems, continuous modem connection must be maintained during the data session. If after a period of time the modem signaling is lost, modems will conclude that the data session has been terminated and will disconnect.

When a telephone call waiting tone (indicating the presence of caller, ID) is detected during a local modem to remote modem data session, a decoding process involving both the local modem and a telephone switching network CO (Central Office) may be undertaken to retrieve the caller ID. During the caller ID decoding process, however, the remote modem usually disconnects. Thus, the remote modem must be redialed to reestablish and continue the data session.

If the local modem does not attempt to decode the caller ID, the call waiting signaling will, at a minimum, interfere with ongoing communication and may cause the modems to hang up or retrain. Thus, the telephone switching network provides a mechanism for turning on and off the call waiting service. Before beginning the modem to modem data session, the call waiting service is turned off for the duration of the session. However, doing so prevents a user from receiving any other incoming calls on a shared telephone line. As a result, users are forced to add dedicated telephone lines for each type of telephony device in their premises.

Further disadvantages of the related art will become apparent to one skilled in the art through comparison of the related art with the drawings and the remainder of the specification.

SUMMARY OF THE INVENTION

Various aspects of the present invention can be found in a communication system having a telephone network that delivers call waiting signaling upon detecting an incoming call. The communication system comprising a remote modem and a local modem communicatively coupled thereto. The local modem, which shares access to the telephone network, detects call waiting signaling and directs the remote modem to enter a hold mode then temporarily relinquishes access to the telephone network.

The local modem may also perform caller identification processing during this process. If so, the caller identification information may be used to determine whether to service incoming calls. Making such determination may involve providing a user interface, or may be performed automatically by a computer coupled to the local modem.

Although unnecessary, the remote modem may remain in the hold mode for no longer than a predetermined interval. Other variations are also possible. For example, the local modem may use a v.42 protocol to set up a secondary channel for signaling the remote modem regarding the hold mode. A table might be used that stores pre-selected caller identification information for comparison with caller identification information associated with incoming calls. Such comparison may be used to determine whether to service incoming calls.

The remote and local modems attempt to maintain the communication session set up between the device housing the remote modem and the device housing the local modem. The remote modem must maintain the appearance of a connection to the upper layer protocols even though the connection to the local modem has been temporarily removed. Similarly, the local modem must maintain the appearance of the connection to the networking protocols using the communication capabilities of the local modem. To carry this out, the remote modem may communicate with upper protocol layers of the network connection with manufactured data while in the hold mode. The local modem similarly maintains the appearance of a network connection with the application requiring the data by manufacturing data and presenting it to the network stack while the two modems are on hold.

These and other aspects of the present invention may also be found in a communication system comprising a local link, a telephony device, a remote and a local modem. Therein, the telephony device is coupled to the local link and may access the link when it is relinquished by the local modem. Specifically, the local modem establishes a data session with the remote modem by dialing a telephone number associated with the remote modem. After detecting a need to relinquish the local link to the telephony device, the local modem directs the remote modem to maintain the data session and temporarily relinquishes the local link to the telephony device.

The local modem may reestablish the data session without redialing the associated telephone number. Further variations are also possible. For example, the local modem may identify the need to relinquish the local link to the telephony device by detecting: a) call waiting signaling, b) a user initiated request, or c) a request that is automatically generated by a computer coupled to the local modem. Three-way calling and call waiting services are used to support the telephony device.

DETAILED DESCRIPTION OF DRAWINGS

Figure 1:
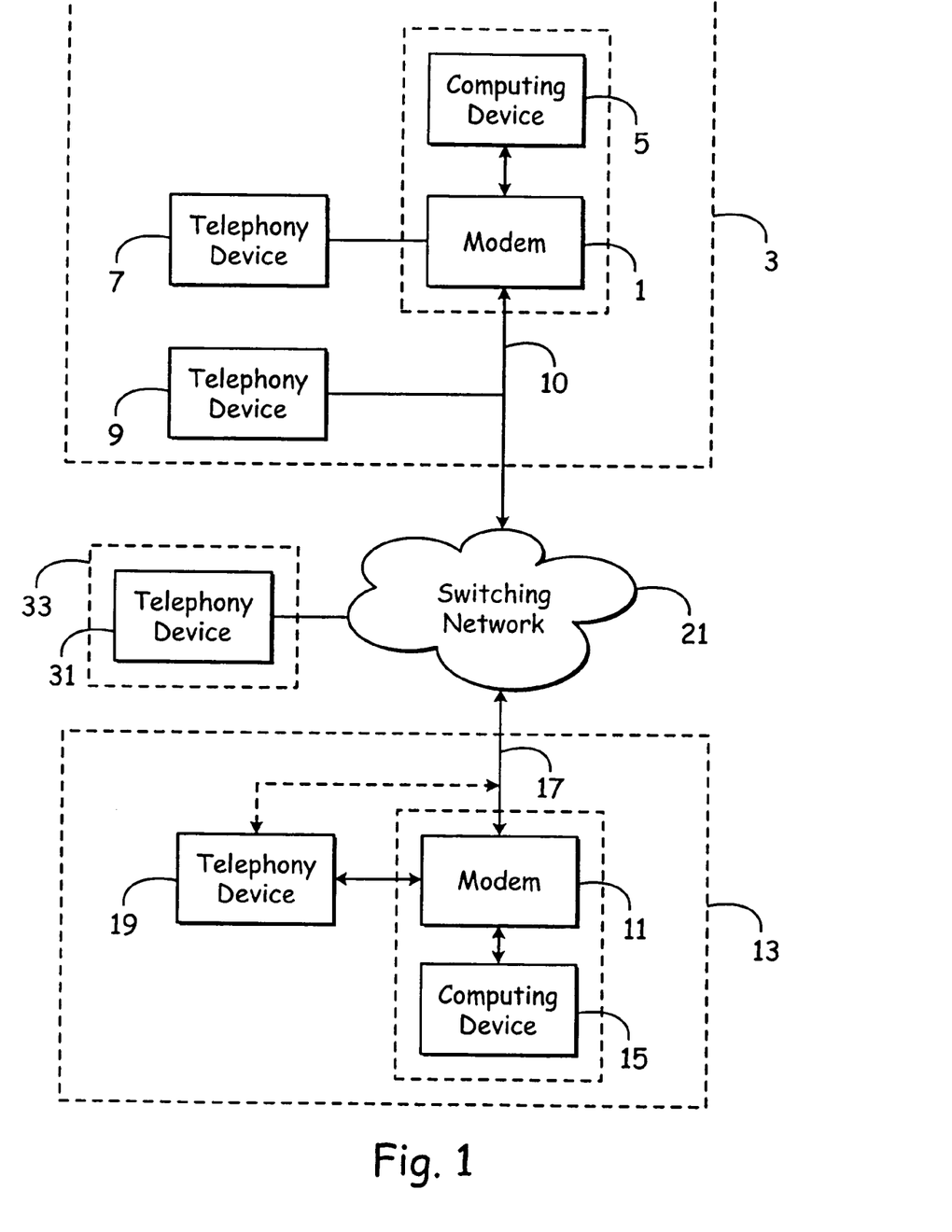
FIG. 1 is a block diagram illustrating an exemplary modem to modem communication network supporting three-way calling, call waiting and caller ID in accordance with various aspects of the present invention.

FIG. 1 is a block diagram illustrating an exemplary modem to modem communication network supporting three-way calling, call waiting and caller ID in accordance with various aspects of the present invention. In particular, a modem 1 at a premises 3 establishes and maintains ongoing communication with a modem 11 at a premises 13 via a switching network 21. If either the modem 1 or the modem 11 detect a need to temporarily relinquish a telephone line 10 or a telephone line 17, respectively, such modem (local modem) communicates to the other (remote modem) a request to hold for a predetermined period of time. If accepted, the remote modem places itself on hold, awaiting either: (a) reestablishment of communication from the local modem, or (b) a time out of the predetermined period of time. After placing the remote modem on hold, the local modem will relinquish or at least offer to relinquish the telephone line 10 or 17. Thereafter, when the telephone line 10 or 17 becomes available, the local modem will automatically reestablish communication with the remote modem. If the predetermined period of time has lapsed, the local modem will automatically call the remote modem. Otherwise, the local modem will reestablish communication by merely accessing the remote modem and engaging in a fast training sequence before carrying on where the modems 1 and 11 left off.

Either of the modems 1 and 11 can determine the need to relinquish their corresponding telephone lines 10 and 17 by (a) receiving call waiting signaling from the switching network 21, (b) detecting a local extension off hook, (c) receiving user input via computing devices 5 or 15, and (d) detecting a need from the associated computing device 5 or 15. When, for example, the modem 1 receives call waiting signaling from the switching network 21 (due to an incoming call from a telephony device 31 at a premises 33), the modem 1 communicates a request to hold to the modem 11.

If the modem 11 honors the request, the modem 11 begins waiting for reestablishment of the data session by the modem 1 for a first predetermined period (e.g., 30 seconds), and the modem 1 interacts with the switching network 21 to retrieve the caller ID information (if configured to do so) and presents an indication of the incoming call, along with caller ID information if employed, via a screen (not shown) on the computing device 5. The computing device 5 may signal a user by simulating a ring signal and delivering a pop-up window containing the caller ID information.

If the user fails to accept the incoming call or rejects such call, the modem 1 will reestablish communication with modem 11 before the first predetermined period lapses. If however the user wants to take the call, the user interacts to accept the call via the computing device 5. The modem 1 responds by communicating a second predetermined hold period (e.g., 30 minutes) to the modem 11 and then "flashes" the telephone line 10. The switching network 21 responds by connecting the incoming call to the telephone line 10. Thereafter, the user is free to use a telephony device 7 or 9, e.g., a telephone, facsimile machine, answering machine, etc., to service the incoming call. When the telephony device 7 or 9 hangs up, the modem 1 "flashes" the telephone line 10. The switching network 21 again communicatively couples the telephone lines 10 and 17, and the modem 1 reestablishes communication with the modem 11. Alternatively, if the telephony device 31 disconnects prior to the modem 1 "flashing," the switching network 21 again communicatively couples the telephone lines 10 and 17, and the modem 1 reestablishes communication with the modem 11. Had the first predetermined time period lapsed before the second predetermined period was communicated or had the second predetermined time period lapsed before the modem 1 reestablished communication, the modem 1 would automatically dial or redial the modem 11 to reestablish the link.

Instead of or in addition to signaling a user via the computing device 105, the modem 1 may also deliver a ring signal or other such indication directly to the attached telephony device 7 or to the locally connected telephone device 9 via the telephone line 10. The modem 11 performs similar functionality in its interaction with the computing device 15 and the telephony device 19 when receiving an incoming call via call waiting services.

The modem 11 may also detect the need to relinquish the telephone line 10 by detecting a local extension off hook event from either the telephony device 7 or 9. For example, when the telephony device 7 happens to comprise a telephone, the modem 1 detects when a user lifts the receiver of the telephony device 7 and, in response, communicates a hold request to the modem 11 and establishes a three-way call dial tone through interaction with the switching network 21. The user may then establish an outgoing call. When the telephony device 7 hangs up, the modem 1 using the three-way calling service features reestablishes the link via the switching network 21 to the modem 11 without having to redial.

A user may also interact via the computing device 5 to request gaining access to the telephone line 10. For example, the user may desire to send a fax from a telephony device 9. The modem 1 responds to such a request by establishing a hold condition with the modem 11 and using three-way calling functionality to gain a dial tone on the telephone line 10. Thereafter, the modem 1 communicates via the computing device to the user that the telephone line 10 is free for use by the telephony device 9. When the telephony device 9 disconnects or the remote side disconnects, the modem 1 again can reestablish the communication link with the modem 11 without having to redial.

Similar functionality also occurs automatically without user interaction. For example, a computing device 5 may periodically gain access to the telephony device 31 to service a communication exchange with the telephony device 31.

In addition, the modem 1 may place the modem 11 on hold to permit the telephony device 7 or 9 to communicate with the telephony device 19. In this way, the primary communication link between the modems 1 and 11 might be used to set up the secondary communication link between the telephony devices 7 or 9 and 19.

The switching network 21 may comprise one or more central offices (COs) interconnected by a toll network. The telephone lines 10 or 17 may comprise twisted pair, cable, fiber and/or wireless links, for example.

The modem 1 and the computing device 5 may be separate or integrated. Similarly, the modem 11 may be internal to the computing device 15 or external.

Figure 2:
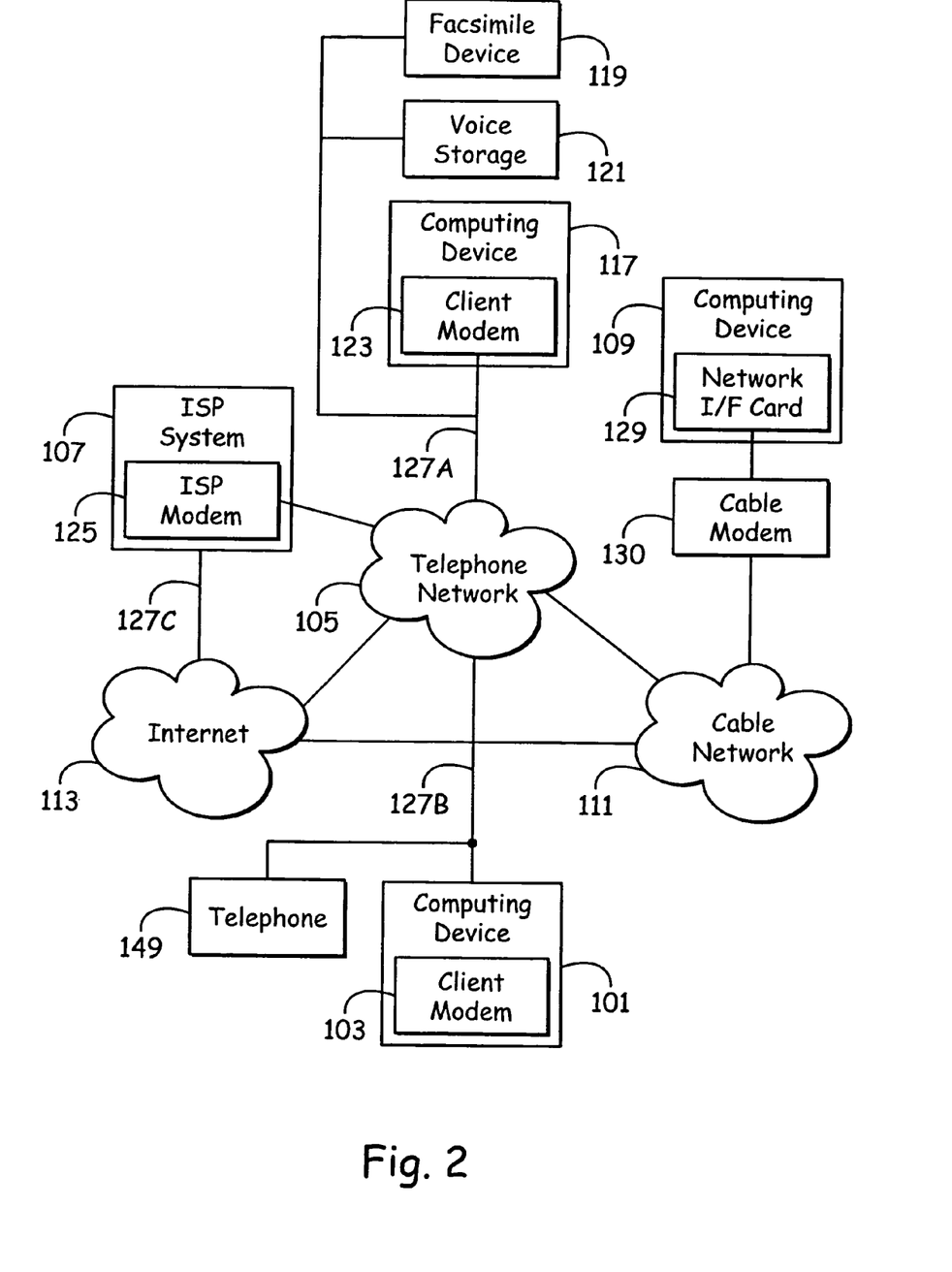
FIG. 2 is an exemplary schematic diagram of an Internet based communication system built in accordance with the present invention utilizing the functionality described in FIG. 1.

FIG. 2 is an exemplary schematic diagram of an Internet based communication system built in accordance with the present invention utilizing the functionality described in FIG. 1. More specifically, a client modem 103 that services a client computer 101 establishes and maintains a data connection with an ISP (Internet Service Provider) modem 125 of an ISP computing system 107.

A user wishing to establish the data session between the client computer 101 and the Internet 113, employs client modem 103 that dials through a telephone network 105 to an ISP modem 125. The ISP modem 125 provides access to the ISP 107 that participates via a link 127C on the Internet 113.

During the existence of the data communication link, the telephone network 105 may receive a telephone call from, for example, a telephone 119. In response, the telephone network 105 delivers call waiting signals to the client modem 103. On detecting a call waiting tone, the client modem 103 signals the ISP modem125 regarding the presence of caller identification. In one embodiment, the client modem instructs the ISP modem 125 to maintain the communication link for a first predetermined period of time. In another, the ISP modem 125 either will wait indefinitely or will have a preset predetermined period which need not be communicated. The client modem 103 next coordinates with the telephone network 105 to receive and decode the caller identification. The caller identification is forwarded to the user via a display on the client modem 103 (if external), and/or on the client computer 101. In turn, based on the caller identification, the user determines whether to terminate the existing data session or ignore the incoming telephone call and return to the existing data session, all within the first predetermined period. If the user fails to act or chooses to reject the incoming call, the client modem 103 will reestablish communication with the ISP modem 125. If the user chooses to accept the call, and if the first predetermined period is not long enough, the client modem 103 will communicate a second predetermined period, e.g., 30 minutes, to the ISP modem 125. Thereafter, the client modem 103 "flashes" the telephone network and signals the user via the client computer 101 as previously discussed and/or, if so configured, via the line 127. The telephone network 105 responds by connecting the incoming call to a line 127. The user may then employ a facsimile device 119 or a voice mail or voice storage system 121, for example, to service the incoming call.

The ISP modem 125 may also be placed on hold by the client computer 101, either through manual user interaction or automatically to meet a need that arises. For example, a user may desire to use the telephone 149 during an ongoing session between the ISP modem 125 and the client modem 203. The user interacts via a window on the computing device 101 to place such request. In response, the computing device 101 directs the client modem 103 to place the session on hold. As before, the client modem 103 communicates a hold request to the ISP modem 125 which may choose to honor the request. If refused, the connection is terminated. If honored, the ISP modem 125 is placed on hold, and the telephone network 105 is signaled to begin three-way calling services. The telephone network 105 provides a dial tone and the client modem 103 directs the computing device 101 to display a ready indication. Thereafter, the user may employ the telephone 149 to place the call.

All other modes of employing three-way calling and call waiting services described in reference to FIG. 1 are also possible. In all cases, the ISP modem 125 and the client modem 123 both communicate with upper layers of the protocol stack to ensure that the session is maintained. Thus, even though the session is actually placed on hold, neither the application software nor the higher protocol stack layers need to be aware of such condition, even though they might be modified to do so.

A point to point data session may exist between the client computer101 and a computer 117. The data session is established after a modem handshake following a dial up routine between the client modem 103 and a modem 123. Caller ID information/call waiting and three-way calling functionality are similarly processed as referenced above.

Additional features of the client modem 103 permits the direction of both faxes received from a fax modem 121 and voice mail received from a voice storage 119. A client computer 109 is connected to the Internet 113 via a cable network 111. A cable modem 130A enables the connection of the client computer 109 and the Internet 113 connectivity and further constitutes part of a communication network 100.

Communication links 127A and 127B couple the client modems 103 and 123 with the telephone network 105. The communication links 127A and 127B comprise twisted pair wiring but may also or alternatively comprise a radio communication link, for example, or may be ISDN, ADSL, or DSL, for example.

Cable modems may be employed which utilize similar functionality. Specifically, a cable modem 130 couples with a computing device 109 via a network interface card 129. A computing device 101 may directly couple with the cable modem 130 via the telephone network 105 and the cable network 111. If a need arises to relinquish the line 127B, e.g., an incoming call is detected by the computing device 101. The computing device 101 sends a hold request to the cable modem 130 which, in turn, "spots" the upper layers of its protocol stack to act like the session is ongoing and begins waiting. As before, the client modem 103 relinquishes the link 127B to servicing the need and, when completed, the client modem 103 reestablishes the session with the cable modem 130 without having to redial.

In a further embodiment, a CO within the telephone network 105 provides an "attention signal" to both the client modem 103 and the ISP modem 125 when, for example, the client modem 103 and the ISP modem 125 are engaged in ongoing communication. The "attention signal" would convey a pending request to at least temporarily change the "ownership" of the telephone line 127B. In such an embodiment, the client modem 103 need not inform the ISP modem 125 that it is considering relinquishing the telephone line 127B.

The CO within the telephone network has been modified to deliver a dial tone while not dropping the second line. Thus, when the client modem 103 detects an extension-off hook condition, e.g., the telephone 149 is picked up, the client modem 101 first signals the ISP modem 125 to go into a hold mode. Next, the client modem 103 requests that the CO generate a dial tone and relinquishes the line to the telephone 149.

In such embodiments as well as the other described herein, call waiting indications, with or without caller ID services are "attention signals." Attention signals are those signals that convey to a modem that a request for another use for a shared telephone line is present. Another example beyond call waiting might be an operator's manual attempts to interrupt an ongoing session in emergency situations. In most embodiments, attention signals are delivered only to the modem whose line is to be shared, yet, as described above, need not be the case. Such attention signals can also be delivered to all parties and modems or telephony devices participating in an ongoing communication exchange.

Additionally, the ISP modem 125 might send a hold request to the client modem 103. While the client modem 103 is on hold, the ISP 107 can change the routing of the ISP modem 125, substitute another ISP modem automatically (for example when ISP modem 125 is having problems or is not optional for the client modem 103), etc. This may all happen without ever relinquishing any telephone link.

The aforementioned functionality also supports Internet browser interoperability. For example, when interacting with a browser running on the computing device 101 to surf the Internet, a user may encounter a telephone number on a web page that they would like to call. By selecting a "place call" button on the browser, the computing device 101 delivers an "attention signal" to the client modem 103 which, in turn, places itself and the ISP modem 125 in a hold mode. Before entering the hold mode, the client modem 103 may also dial the number and if so configured and pursuant to meta information provided in the web page, may interact with the answering party or system to assist the user in reaching a desired location within the receiving party's answering system. Whether or not such additional services are provided by the client modem 103, the computing device 101 then delivers a signal to the user to pick up the telephone 149.

Figure 3:
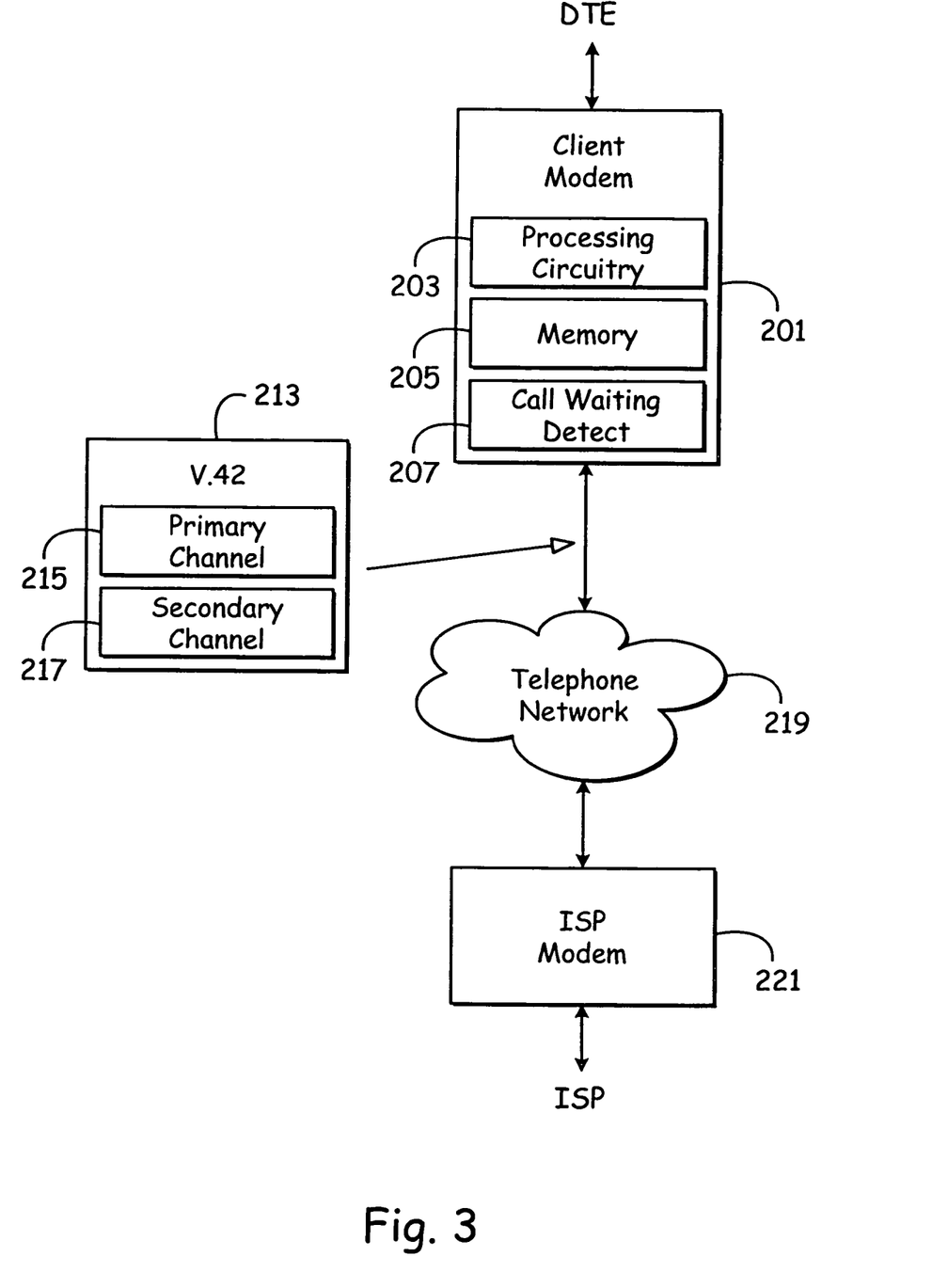
FIG. 3 is an exemplary embodiment of the communication system of FIG. 2, illustrating DCE signaling of an ISP to make the ISP caller ID aware.

FIG. 3 is an exemplary embodiment of the communication system of FIG. 2, illustrating DCE signaling of an ISP to make the ISP caller ID aware. More specifically, using a secondary channel 217, a client modem 201 signals an ISP modem 221 to make the ISP modem 221 aware when a call waiting signaling is received.

A user utilizing the client modem 201 engages in a data session on a primary channel 215 with an ISP modem 221 via a telephone network 219. When a call waiting tone is detected during the data session, call waiting detect circuitry 207 informs a processing circuitry 203 that an incoming telephone call has been detected. In response, the processing circuit 203 signals the ISP modem 221 informing of the call waiting event. The processing circuitry 203 then utilizes a secondary channel 217 to signal the ISP modem 221 to refrain from disconnecting while the ISP modem 221 decodes the received caller identification information. In response, the ISP modem 221 may choose to accept by transmitting an acknowledgment signal.

After receiving the acknowledgement, the processing circuitry 203 performs caller ID processing to retrieve the caller ID information from the telephone network 219. Specifically, the processing circuitry 201 transmits a DTMF tone to a central office (CO) within the telephone network directing that the caller ID information be forwarded. The CO then transmits a Bell 211 signal having the caller ID information (while muting the data session line connected to the ISP modem 221). The processing circuit switches from its current protocol, typically V.90 to the Bell 212 mode and receives the caller ID information. The caller ID information is presented to the user through a LCD display within the client modem 201 or through a pop-up window generated by the user's software, for example, and requesting whether the user wishes to accept or reject the incoming call.

In one embodiment, if the user accepts the incoming call, the ISP modem 221 retains the data session connection for a predetermined time while the client modem 201 is engaged with the incoming call. On returning, the client modem 201 resynchronization with the ISP modem 221 to continue the prior data session, that is, the client modem 201 and the ISP modem 221 go through timing synchronization, train echo cancellers and transmit known signal conditions, for example. If after the expiration of the predetermined interval, the client modem 201 fails to return, the data connection is terminated.

In an alternate embodiment, the user may accept the incoming call while the ISP modem 221 is instructed to idle. When the client modem 201 returns, a fast resynchronization algorithm is used to re-establish communication more rapid because prior line conditions are known, and both modems need not go through full retraining. Further detail regarding "resynchronization" can be found in U.S. patent application Ser. No. 09/361,842 (filed Jul. 27, 1999) and entitled "Method and Apparatus for Fast V90 Modem Startup"; and U.S. application Ser. No. 09/394,018 (filed Sep. 10, 1999) and entitled "Method and Apparatus for Quick Modem Reconnect". These applications are hereby incorporated herein by reference in their entirety.

Another functionality previously described with reference to FIGS. 1-2 also apply for interactions between the client modem 201 and the ISP modem 221. In addition, the client modem 201 may employ a look up table as further referenced in FIG. 5 to determine how and whether to service an incoming call.

The secondary channel 217 is a virtual channel set up using the V.42 protocol. This is a proprietary mode in which both the client modem 201 and the ISP modem 221 communicate their capabilities and exchange information through the secondary channel 217. The processing circuitry 203 employs software, hardware and firmware to direct and synchronize various tasks relating to the client modem 201. Although described in reference to ISP communication, such functionality also applies outside of that context.

Figure 4:
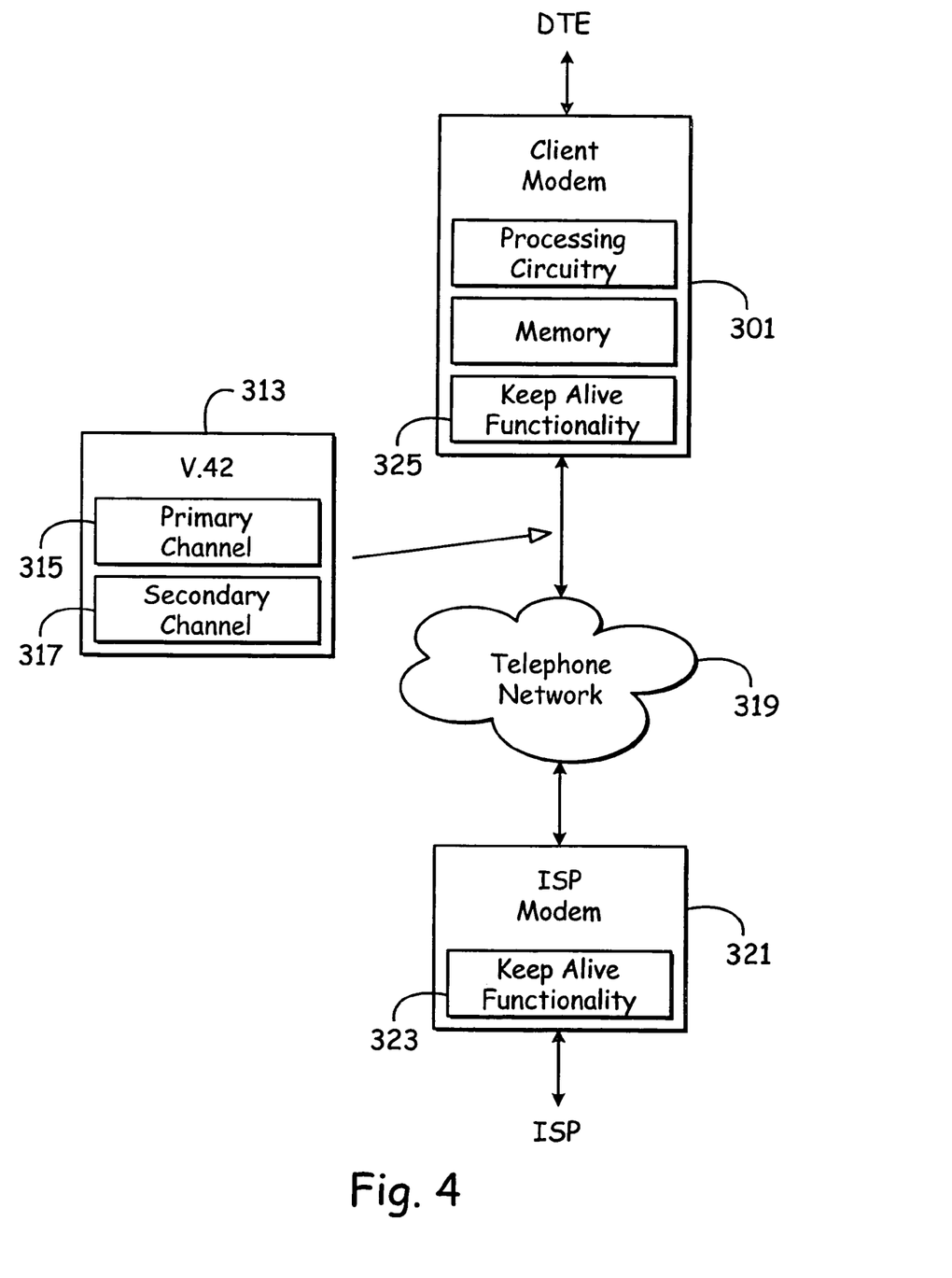
FIG. 4 is an alternate exemplary embodiment of the communication system of FIG. 3 that employs keep alive functionality to maintain continuous data session.

FIG. 4 is an alternate exemplary embodiment of the communication system of FIG. 3 that employs keep alive functionality to maintain continuous data session. Specifically, the ISP modem 321 employs a keep alive function 323 which delivers "keep alive packets" to higher protocol whether or not the client modem 301 sends a hold request.

Particularly, there are several layers of protocol involved in the connection between a user's Internet browser, for example and an ISP, and these layers have to be "kept alive" while the client modem 301 relinquishes a link 331 for call waiting services or otherwise. During a data session, while the client modem 301 has relinquished the link 331, the higher protocol layer, for example, TCP/IP, may encounter a time out condition and terminate the data session.

To achieve a continuous data session, when caller ID is received, the bottom two layers namely, the physical and the data link layer, responsible for transmission, framing, and error control of the communications link may be modified. In one embodiment, the keep alive functionality 323 within the ISP modem 321 transmits "keep alive" packet streams to the higher TCP/IP protocol layer after the modem signal is interrupted. This deceives the higher TCP/IP layers and prevents the session from terminating. The "keep alive" packet stream may be either data bits or control signals or both, and located within the client modem 301, the ISP modem 321 or both.

Again, the keep alive stream need not require a hold request to be used. In fact, in one embodiment, the ISP modem uses the keep alive whenever it is having difficulty reaching the client modem 301 for whatever reason. The stream is used for a predetermined period to allow reestablishment of the link during a period that far needs a traditional session termination period.

Figure 5:
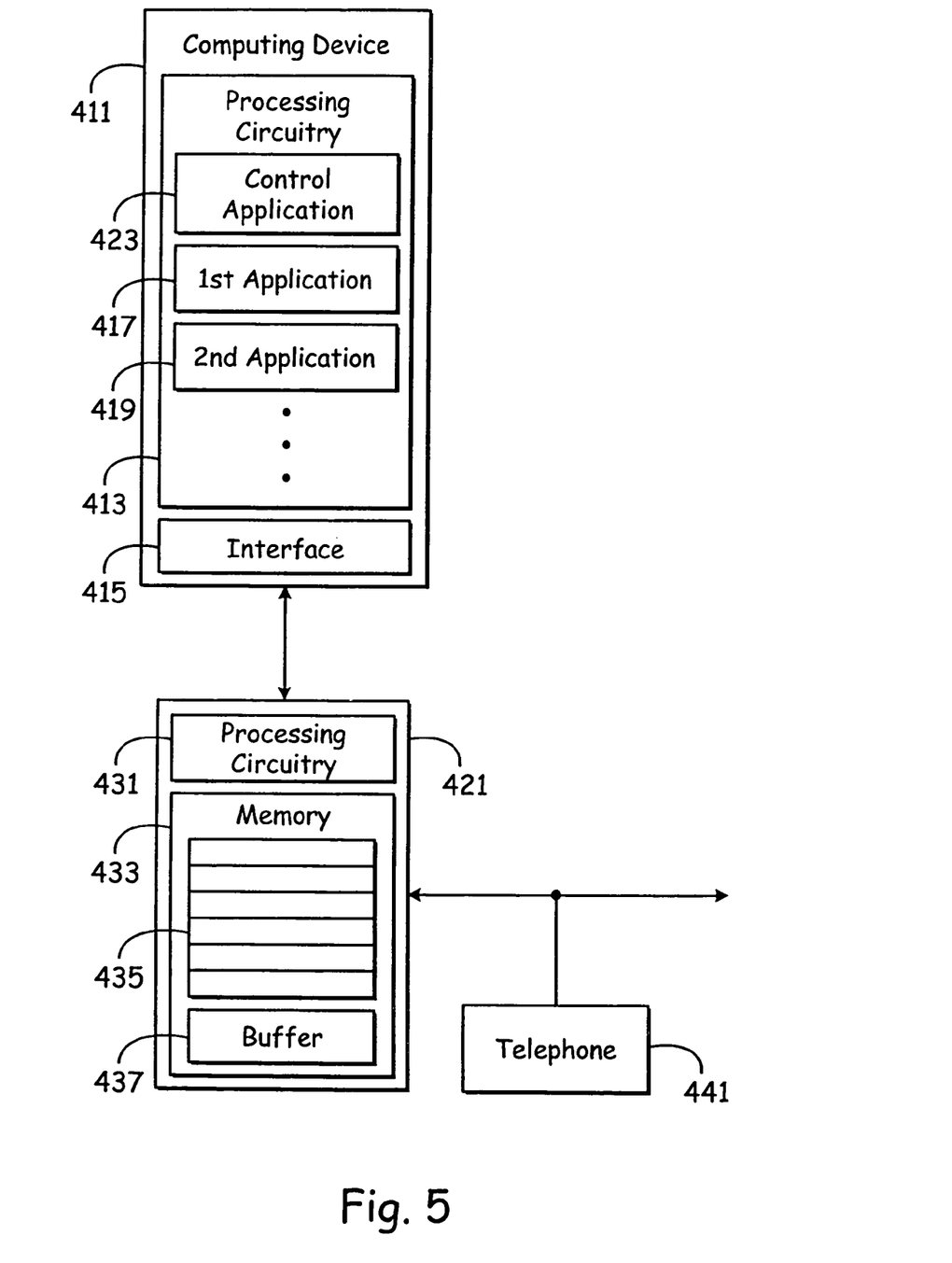
FIG. 5 is a schematic diagram of a computing device 411 coupled to a modem 421 having a memory look up table, according to the present invention, and permitting call classification and functional assignment prior to forwarding caller ID information to the computing device 411.

FIG. 5 is a schematic diagram of a computing device 411 coupled to a modem 421 having a memory look up table, according to the present invention, and permitting call classification and functional assignment prior to forwarding caller ID information to the computing device 411. The computing device 411 comprises a processing circuit 413 and other conventional circuitry such as an interface circuit 415.

The processing circuit 413 operates pursuant to a plurality of applications (e.g., a first and second application 417 and 419) that independently service incoming calls via the modem 421. A control application 423 selectively interacts to launch the plurality of applications.

The modem 421 comprises a processing circuit 431 and a memory 433, among other circuitry. The modem 421 determines whether to forward the caller ID information to the computing device 411 based on a table 435 within the memory 433. The table 435 stores a series of caller ID cross reference entries. Thus, for example, upon detecting an incoming call, the modem 421 notifies an ISP modem (not shown) that it is about to interrupt the present modem connection to receive caller ID information. When the caller ID information is received, the processing circuit 431 stores the caller ID information in a buffer 437 and compares that information with the entries in the table 435.

If a match is found, the processing circuit 431 informs the ISP modem that delivers the buffered caller ID information to the computing device 411 to the control application 423 which, in turn, launches the appropriate application that has been designated to service the received caller ID information. The caller ID information may also be forwarded to such application.

If no match is found, the modem 421 will ignore the incoming call and continue the data session with the ISP modem. Thus, the modem 421 need not involve the computing device 411 or bother the user by forwarding caller ID information unless it has been assigned to do so via the entries in the table 435. In this embodiment, the table is used to forward only those incoming calls that have a table entry. However, in alternate embodiments the table may be used to screen out matching incoming calls.

The user via computing device 411 loads the table 435 with, for example, telephone numbers of incoming calls to be processed by the first and second applications 417 and 419. In an exemplary embodiment, the first application 417 comprises facsimile processing software, while the second application 419 comprises data processing software. If facsimile transmissions are only to be received from a single telephone number, that telephone number is loaded into the table 435 of the modem 421, similarly, the telephone numbers from which data transmissions will be received are also loaded into the memory 435. When a facsimile transmission is received from the telephone number stored in the table 435, the processing circuitry 431 delivers the caller ID information to the computing device 411, and immediately switches to the facsimile transmission without user interference.

Thereafter, the control application 423 directs the first application 417 in handling the transmission. When the facsimile transmission is completed, the control application 423 cooperates with the modem 421 to return the user to the prior data session. When an incoming data transmission is received from a corresponding telephone number stored in the table 435, the processing circuit 431 delivers the caller identification to the computing device 411 for processing by the second application 419, for example. Calls from telephone numbers that are not contained in the table 435 may be ignored by the modem 421.

Alternatively, or in addition, the table may be loaded with caller ID information that identifies telephone numbers to be ignored and not answered by the DCE/DTE. For example, known voice telephone numbers may be ignored by the DCE 421 while all other non-tabled numbers would be answered by the DCE 421.

Thus, by screening and/or the selection of specific calls, the DCE is able to save time expended by the user in determining which telephone calls to accept. In addition, a single telephone line may be shared by a plurality of communication devices, such as the DCE 421 and other DCEs or telephones. Further, such screening and/or filtering may also be employed to remove unnecessary call processing burdens from an active DTE which may be engaged in other tasks. Thus, for example, the computing device 411 during a data session need not have to share processing resources to service calls not intended for the computing device 411.

Although the table 435 is shown to be stored within the modem 421, it might be alternatively be stored within the computing device 411. In such embodiments (not shown), the computing device 411 still automatically filters unwanted incoming calls.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A routing method for use by a communication network while a first modem is in communication with a second modem over a communication line, said routing method comprising:
   transmitting a network request by said communication network to said first modem to request said first modem to initiate a modem on hold process for placing said communication over said communication line with said second modem on hold;
   receiving an acknowledgement by said communication network from said first modem that said communication between said first modem and said second modem over said communication line has been placed on hold for a predetermined period of time; and
   substituting a third modem for said first modem in response to said receiving said acknowledgement, wherein said second modem starts communicating with said third modem over said communication line after said predetermined period of time elapses.

2. The routing method of claim 1, wherein said communication network is an Internet Service Provider.

3. The routing method of claim 1, wherein said transmitting said network request by said communication network to said first modem is in response to detecting a problem with said first modem.

4. A communication network for routing a communication line while a first modem is in communication with a second modem over said communication line, said communication network comprising:
   a transmitter configured to transmit a network request to said first modem to request said first modem to initiate a modem on hold process for placing said communication over said communication line with said second modem on hold;

a receiver configured to receive an acknowledgement from said first modem that said communication between said first modem and said second modem over said communication line has been placed on hold for a predetermined period of time; and wherein said communication substitutes a third modem for said first modem in response to said acknowledgement, and wherein said second modem starts communicating with said third modem over said communication line after said predetermined period of time elapses.

5. The communication network of claim 4, wherein said communication network is an Internet Service Provider.

6. The communication network of claim 4, wherein said transmitter transmits said network request to said first modem in response to detection of a problem with said first modem.

7. A communication method for use by a computing device running an Internet browser, said computing device being in communication with a modem, said communication method comprising:

enabling a user to browse the Internet, using said Internet browser running on said computing device, via a modem connection established by said modem over a communication line with a remote modem;

receiving a user selection for placing a call, wherein said user selection is generated by said user selecting a place call button on said browser;

requesting said modem to place said modem connection with said remote modem over said communication line on hold;

receiving an acknowledgement by said computing device from said modem that said modem connection over said communication line has been placed on hold; and delivering a signal to said user, in response to said receiving said acknowledgment, that said user may use a handset for said call over said communication line.

8. The communication method of claim 7 further comprising: using a three-way-calling functionality to gain a dial tone for initiating said call.

9. The communication method of claim 7 further comprising: detecting said handset disconnecting said call, and reestablishing said modem connection without said modem redialing.

* * * * *

UNITED STATES PATENT AND TRADEMARK OFFICE
CERTIFICATE OF CORRECTION

PATENT NO.        : 7,587,034 B2
APPLICATION NO.   : 11/072776
DATED             : September 8, 2009
INVENTOR(S)       : Olafsson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Twenty-first Day of September, 2010

David J. Kappos
*Director of the United States Patent and Trademark Office*